United States Patent [19]

Abraham

[11] Patent Number: 5,533,002
[45] Date of Patent: Jul. 2, 1996

[54] OPTICAL DATA STORAGE COMPACT DISC AND METHOD FOR MANUFACTURING THE SAME

[76] Inventor: Nigel C. Abraham, 14c West Avenue, Gosforth Newcastle-upon-Tyne NE38 4ES, United Kingdom

[21] Appl. No.: 211,607

[22] PCT Filed: Oct. 19, 1992

[86] PCT No.: PCT/GB92/01920

§ 371 Date: Apr. 7, 1994

§ 102(e) Date: Apr. 7, 1994

[87] PCT Pub. No.: WO93/08565

PCT Pub. Date: Apr. 29, 1993

[30] Foreign Application Priority Data

Oct. 19, 1991 [GB] United Kingdom .................. 9122247

[51] Int. Cl.[6] ....................................................... G11B 7/24
[52] U.S. Cl. ........................................... 369/275.3; 369/13
[58] Field of Search .............................. 369/275.3, 275.1, 369/275.4, 100, 112, 275.2, 283, 288, 13; 359/22, 23, 24, 26, 15, 17, 18; 428/694 SC, 694 MM, 694 T

[56] References Cited

U.S. PATENT DOCUMENTS

| | | | |
|---|---|---|---|
| 4,597,814 | 7/1986 | Colgate, Jr. .............................. | 156/219 |
| 5,155,605 | 10/1992 | Wreede et al. ............................ | 359/24 |
| 5,223,957 | 6/1993 | Itoh et al. ................................. | 359/17 |
| 5,253,087 | 10/1993 | Yang ......................................... | 359/16 |
| 5,282,066 | 1/1994 | Yu et al. .................................... | 359/3 |
| 5,300,169 | 4/1994 | Tahara ................................... | 359/15 X |

FOREIGN PATENT DOCUMENTS

| | | |
|---|---|---|
| 1196720 | 11/1985 | Canada . |
| 0070031 | 1/1983 | European Pat. Off. . |

*Primary Examiner*—Ali Neyzari
*Attorney, Agent, or Firm*—Edwin D. Schindler

[57] ABSTRACT

An optical data storage disc, for example, a compact disc, has one side formed with a pattern of indentations defining a digital data recording, and this side is metallized and further coated with a layer, which is embossed with a relief pattern defining a holographic image. The hologram may extend across the whole surface of the disc and is visible from the top side of the disc, while digital information is readable in a conventional manner using a laser directed at the underside of the disc.

6 Claims, 1 Drawing Sheet

OPTICAL DATA STORAGE COMPACT DISC AND METHOD FOR MANUFACTURING THE SAME

BACKGROUND OF THE INVENTION

This invention relates to an optical data storage disc and particularly but not solely to an optical data storage disc in the form of a compact disc (CD) which carries an audio recording. The invention also relates to a method of manufacturing such optical data storage discs.

In forming recorded compact discs, firstly the digital information, primarily audio, is recorded onto a master disc by forming the surface of the master disc with pits of varying circumferential lengths, but uniform width and depth. These pits are formed by selectively exposing a surface coating on the disc with a laser beam, typically using a blue line such as the 457. 9 mm line from an Argon laser. Typically the surface coating comprises a high resolution positive photoresist, formed on a glass substrate. The areas which are exposed by the laser beam are developed using a caustic developer solution which removed the photoresist coating over those areas. The depth of the pits thus formed by the developer is normally in the range 0.1 to 0.2 microns. The exposed and developed master disc then has a thin conductive layer usually silver deposited onto the pits, normally by vacuum deposition although spray silvering and other techniques may be used. The master disc is then placed in an electroforming tank, where a layer of nickel is formed over the silver layer. The master disc is then put through a number of stages, known in the art, to produce a nickel stamper. This stamper is then applied to polycarbonate blank discs, either by pressing or vacuum forming, and the polycarbonate discs then receive a layer of aluminium and a protective coating of lacquer, which is subsequently printed upon. The process thus provides compact discs in playable form.

In forming embossed holograms, a positive photoresist coated on a glass substrate is exposed using a blue line from a laser. The process comprises recording an interference pattern between two or more wavefronts of laser light, created under extremely stable conditions and normally on an isolation table. The interference pattern, or interference fringes, provide light and dark areas, often with complex nuances which, when developed, redirect light to produce three dimensional images or other effects. The interference fringes which are recorded are often of 0.3 microns or less in depth and have a pitch normally in the range of 0.5 microns to 5 microns. In forming a holographic recording the photoresist is partially exposed over all of its area, with different regions receiving different levels of exposure involving complex phase relationships. Because of this, and also because the diffraction efficiency is reduced if the photoresist is removed right down to the substrate, generally a relatively thick photoresist coating is used, typically 1 to 2 microns thick. Also a developer is chosen which brings out the subtleties of exposure, rounding the edges of the pits to an extend which would be excessive for digital information, which requires pits with very sharp edges. The exposed and developed master is then subjected to electroforming etc. and a nickel stamper is produced, generally as for the compact disc master, and holograms can be formed by pressing or injection moulding in much the same way as for compact discs, though this is not normally the case.

Thus, traditionally the duplication of a relief hologram onto another substrate is done by embossing, using heat and pressure. The majority of current techniques for the mass production of relief holograms involve rotary techniques, in which nickel shims (thin nickel plates in the region of 35 to 100 microns in thickness) are mounted onto a roller, using either mechanical fixing or various adhesive systems, and then the embossing rollers and consequently the shims are heated (using oil or electric heaters), so that the shims are able, with the aid of pressure, to emboss various substrates. The substrates are normally embossed and subsequently metallised or they may be embossed after the material has already been metallised. Alternative methods such as casting, solvent embossing (using solvents to soften various plastics prior to embossing), and molding have also been used successfully.

It will be appreciated from the foregoing that the considerations required for producing optical data storage discs with high quality digital e.g. audio recordings, are quite different from and incompatible with the considerations required for producing holograms with high quality optical recordings.

However, we have now devised an optical storage disc which carries both a digital recording and a hologram, and we have devised a method of manufacturing such discs.

SUMMARY OF THE INVENTION

In accordance with this invention there is provided an optical data storage disc having one side formed with a pattern of indentations defining a digital data recording, said side being metallised and further coated with a layer which is embossed with a relief pattern defining a holographic image.

We have found it possible to provide and emboss the layer over the indented side of the disc, without degrading the quality of the pattern or indentations or affecting the process of reading the digital information in the usual manner, i.e. using a laser beam directed at the opposite or underside of the disc.

The holographic pattern may extend over any desired area of the one side of the disc. The embossed layer is preferably metallised and then preferably covered with a protective coating.

The one side of the disc may finally be printed with human-readable information, but instead any required information may be carried in the hologram.

Also in accordance with this invention, there is provided a method of manufacturing an optical data storage disc, comprising forming a disc which has a pattern of indentations over one side thereof, said pattern of indentations defining a digital data recording, metallising said side of the disc, then coating said side with a layer of material which is embossed with a relief pattern defining a holographic image.

BRIEF DESCRIPTION OF THE DRAWING FIGURES

Embodiments of this invention will now be described, by way of examples only and with reference to the accompanying drawings, in which:

FIG. 1 is a perspective view of an optical data storage disc in accordance with this invention; and FIG. 2 is an enlarged section through the optical data storage disc of FIG. 1.

DETAILED DESCRIPTION OF THE DRAWING AND PREFERRED EMBODIMENTS

Figure 1:
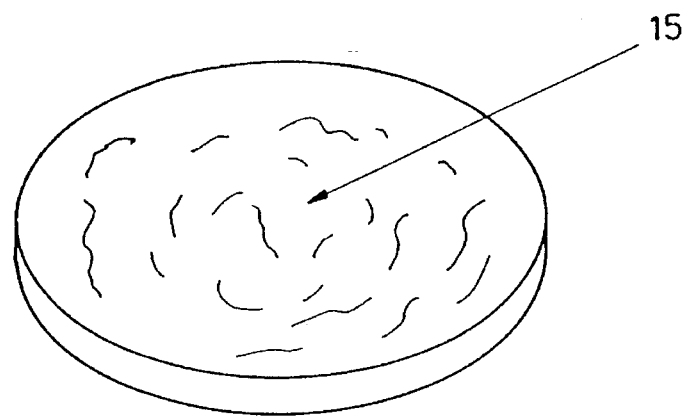
Figure 2:
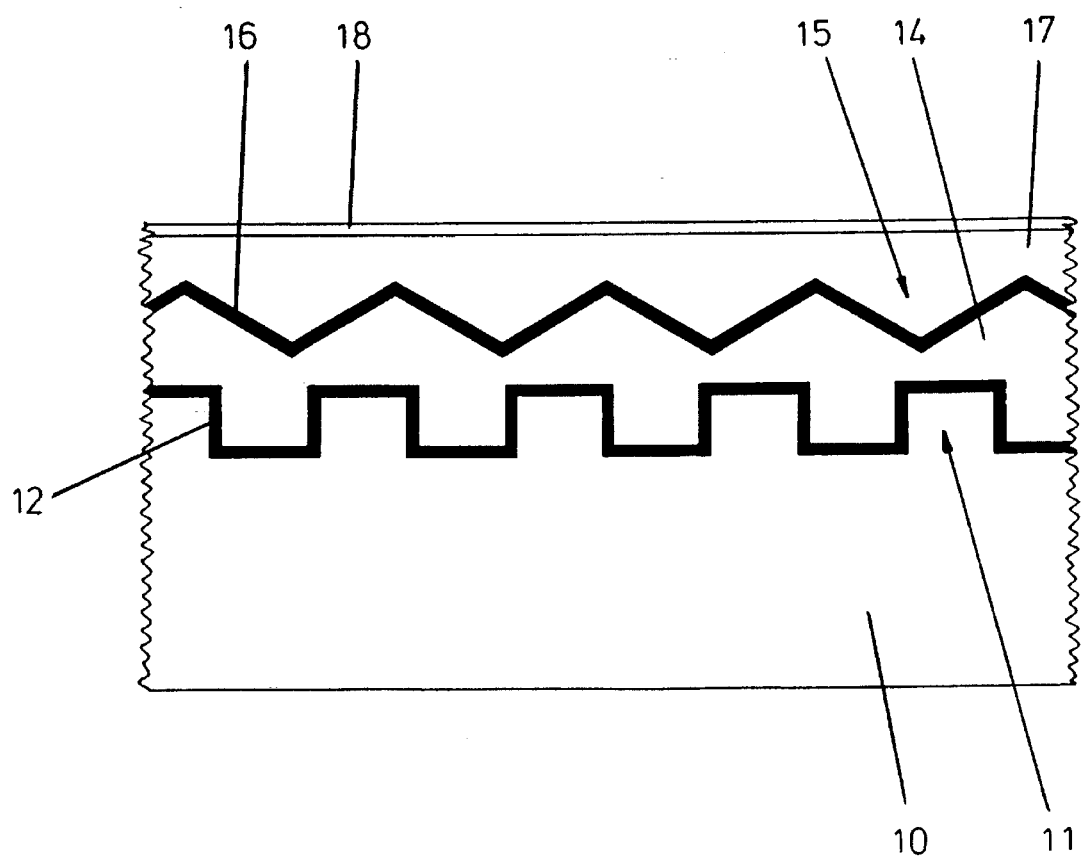

Referring to the drawings, there is shown an optical data storage disc in the form of a compact disc (or CD) which carries a digital audio recording. The disc comprises a substrate 10 of polycarbonate typically 1.2 mm thick having one side formed with a pattern of indentations or pits 11 defining the digital recording. This side of the disc is metallised, as indicated at 12, and further coated with a layer 14 of thermoplastics material, the surface of which is embossed, as indicated at 15, with a relief pattern defining a holographic image. The embossed surface 15 is metallised, as indicated at 16, and further covered by a coating of protective lacquer 17, onto which printing may be applied (e.g. using transparent or translucent inks) as indicated at 18.

The holographic relief pattern may extend over any desired area of the disc. We have found it possible to provide and emboss the layer 14 over the indented side of the disc, without degrading the quality of indentations and without affecting the process of reading the digital information in the usual manner, i.e. using a laser beam directed at the opposite or underside surface of the disc, the holographic image being viewed from the upper side of the disc. The upper side may be printed with human-readable information, but instead any required information may be carried in the hologram.

In one method of manufacture, the disc 10 is formed by injection moulding and then vacuum metallised (often by sputtering) and the metallised disc is then spun-coated with the layer 14 of embossable lacquer, which is then cured or dried. The layer 14 is then embossed using heat and pressure, applied by one of several available methods. For example, the layer 14 may be impressed by a flat-bed platen normally heated for example by a conventional electric element behind the embossing shim or by passing an electric current through the shim. The shim profile may differ from a standard flat profile, to take into account variations across the disc and reduce the chances of air entrapment. Alternatively the embossable lacquer may be embossed or cast using a rotary embossing cylinder.

In another method of manufacture, the holographic relief may be applied by casting, negating the necessity for high pressures and temperatures, and making it possible to run the relief transfer at room temperature. Another advantage of this technique is that nickel shims do not have to be used and cheaper alternatives such as flexible polyester holographic relief shims may be used.

A preferred method of manufacture comprises taking the pressed or injection moulded optical disc 10 (at this stage being a transparent polycarbonate disc), metallising this with aluminium, in-line, using a sputtering method, transferring this disc to a spin-coater to apply a UV curable, embossable lacquer, then subsequently curing this using UV radiation. The embossable layer is then embossed using a platen system, with a nickel shim having a crown-like profile and heated by passing a high current through it from a low voltage electrical supply, after applying high pressure behind the shim onto the disc. The platen is raised and the disc is passed back to the sputterer for metallising, after which it is coated with a tough UV lacquer which is then cured.

A variation on the above method is to emboss after just partial curing of the embossable U.V. lacquer, and then complete the U.V. curing, before passing onto the metallising stage.

The holographically embossed or cast discs may be metallised in batches in a vacuum metalliser, and then passed to a station for application of the protective top coat.

Various layers may be omitted to produce an inferior but still usable product. For instance both the metallisation 16 and the protective lacquer 17 may be omitted. In this case the embossed lacquer 14 acts both to receive a holographic image and as a protective layer.

Alternatively, just the top protective lacquer 17 can be omitted but this still makes the holographic relief prone to damage. It is possible to print directly onto the metallisation 16 using inks such as oxidising inks.

An advantage of this invention is that any kind of hologram can be integrated into the optical data storage disc, making it extremely versatile. In the past putting holograms extending across the whole surface of an optical data storage disc has been impractical because either hot stamping holograms onto a disc has proved to be non-commercial for cost and/or quality reasons and the same has been true for the application to the disc of holographic self-adhesive labels.

I claim:

1. An optical data storage disc having a first side and an opposite, second side, said disc comprising:

a substrate having a first side;

a pattern of indentations formed in said first side of said substrate;

a film of reflective material applied over said first side of said substrate, said pattern of indentations defining a digital data recording to be optically read form said second side of said disc;

a coating of embossable material carried on said first side of said substrate, said coating having a surface which is embossed with a relief pattern defining an optically variable image to be viewed from said first side of said disc; and, a second film of reflective material applied over the embossed surface of said coating.

2. The optical data storage disc as claimed in claim 1, further comprising a protective layer applied over said film of reflective material on the embossed surface of said coating.

3. The optical data storage disc as claimed in claim 2, wherein said protective layer has a surface which carries printing.

4. A method of manufacturing an optical data storage disc having a first side and an opposite, second side, said method comprising the steps of:

forming a disc substrate having a first side formed therein with a pattern of indentations;

forming a reflective film over said first side of said disc substrate, said pattern of indentations defining a digital data recording to be optically read from said second side of said disc;

providing said first side of said disc substrate with a coating of embossable material;

embossing a surface of said coating with a relief pattern, said relief pattern defining an optically variable image to be viewed from said first side of said disc; and, applying a second reflective film over the embossed surface of said coating.

5. The method as claimed in claim 4, wherein said step of providing said coating of material comprises spin-coating a lacquer onto said first side of said disc substrate and then curing said lacquer.

6. The method as claimed in claim 4, further comprising the step of applying a protective layer over said reflective film on the embossed surface of said coating.

\* \* \* \* \*